Feb. 16, 1943.  M. J. P. BOGART ET AL  2,311,180
DISTILLATION
Filed April 4, 1941  3 Sheets-Sheet 1

Overhead Product

Bottoms Product

INVENTORS
Marcel J.P. Bogart &
BY James S.F. Carter
ATTORNEY

INVENTOR
Marcel J. P. Bogart and
BY James S. F. Carter
Nathaniel Ely
ATTORNEY

Patented Feb. 16, 1943

2,311,180

UNITED STATES PATENT OFFICE 2,311,180

DISTILLATION

Marcel J. P. Bogart, Teaneck, N. J., and James S. F. Carter, Oceanside, N. Y., assignors to The Lummus Company, New York, N. Y., a corporation of Delaware Application April 4, 1941, Serial No. 386,798

10 Claims. (Cl. 202—52)

This invention relates to the separation by distillation of a mixture of liquids having relatively close boiling points at atmospheric pressure. It is more particularly a continuation-in-part of our prior applications, Serial Number 201,864, filed April 14, 1938, now Patent Number 2,240,752, issued May 6, 1941, and Serial Number 239,452, filed November 8, 1938, now Patent Number 2,241,110, issued May 6, 1941.

The separation by distillation of a liquid mixture, the components of which have relatively close boiling points at atmospheric pressure and have vapor pressure (boiling point) curves that converge with an increase in absolute pressure, is frequently necessary in both laboratory and commercial practice. The purpose of the separation may be to obtain the components of the mixture in a substantially pure condition or to obtain desired fractions of the initial mixture. When such a separation is carried out in a bubble deck distillation column, a large number of bubble decks is required; and the resulting pressure drop across the decks raises the pressure of distillation in the lower portion of the column to a point approaching or equal to a critical point at which further separation by distillation becomes impossible so that the desired separation can not be accomplished. Such considerations apply when distillation at atmospheric pressure is attempted or when vacuum distillation is resorted to in order to effect the separation. Where the separation is carried out in a packed distillation column or the like, similar considerations apply. For these reasons some mixtures have proved commercially inseparable by distillation.

One of the principal objects of this invention is to provide an improved method for the separation by distillation of a mixture of materials having close boiling points at atmospheric pressure whereby a more accurate control of the distillation can be had and operating costs can be materially reduced.

Another object of the invention is to provide an improved method of separating by vacuum distillation a mixture of materials having relatively close boiling points at atmospheric pressure into two desired end products in a distillation system whereby a desired purity of one end product is obtained in one distillation zone thereof and a desired purity of the other end product is obtained in another distillation zone thereof and whereby the pressure drop between the respective ends of each distillation zone is maintained at a minimum.

Another object of the invention is to provide an improved method of distilling a mixture of materials having close boiling points at atmospheric pressure, in which the distillation takes place in a plurality of separate but interconnected distillation zones with the bottoms of a succeeding zone used as reflux for the preceding zone and with the overhead from the preceding zone condensed and revaporized and introduced into the bottom of the succeeding zone.

A still further object of the invention is to provide an improved distillation apparatus having a large number of individual bubble decks, the normal pressure drop through which is greater than can be tolerated for a desired separation by distillation, with the decks grouped in zones so interconnected as to provide a relatively low maximum pressure drop between the top and the bottom of each distillation zone.

Further objects and advantages of our invention will appear from the following description of a preferred form of embodiment thereof taken in connection with the attached drawings, in which.

Figure 3:
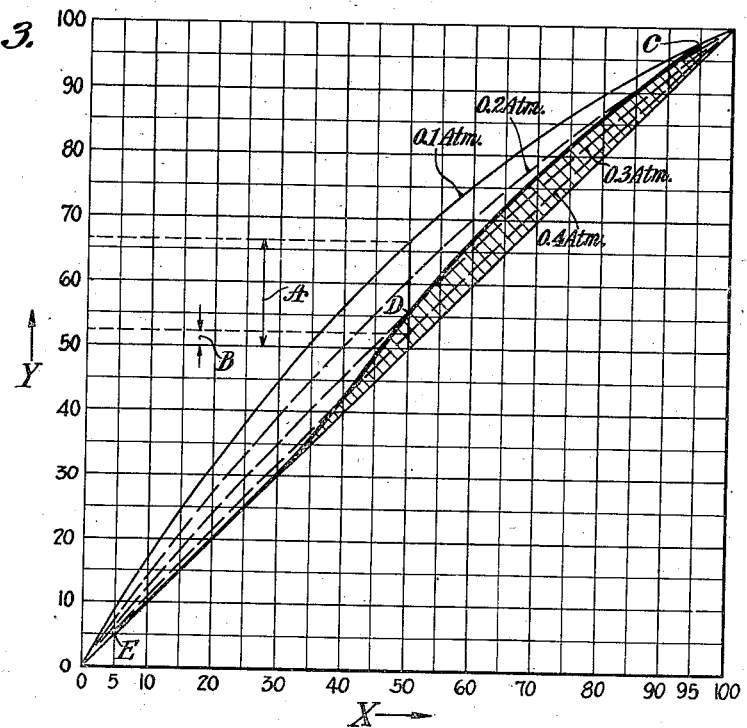
Figure 4:
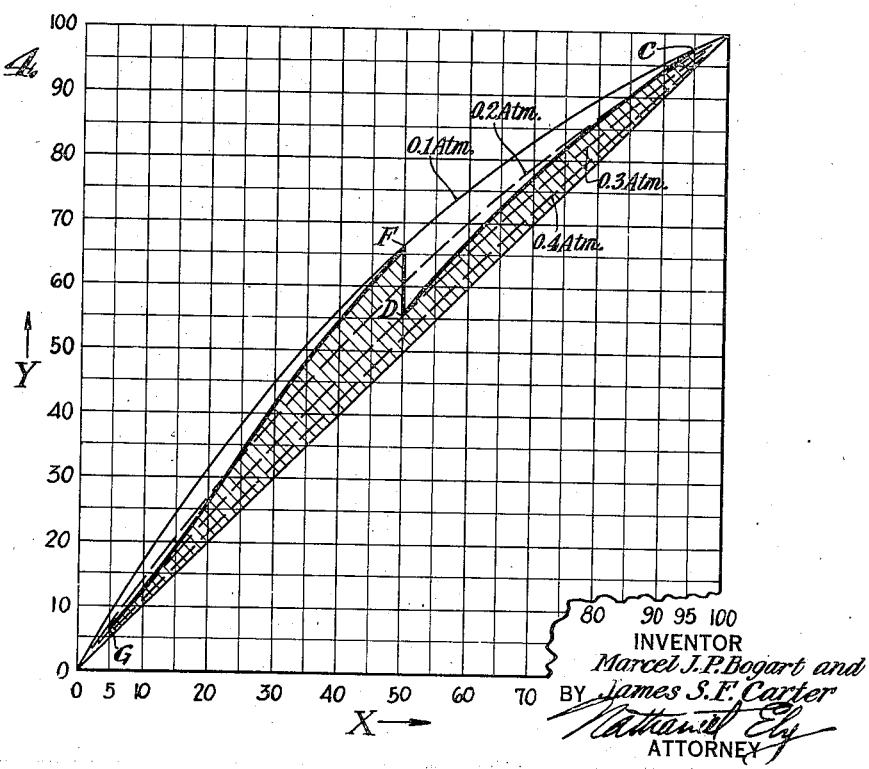

Fig. 3 presents a set of liquid-vapor equilibrium curves for a particular mixture of components having boiling points relatively close at atmospheric pressure and shows the effect of pressure drop in customary distillation practice;

Fig. 4 presents the same set of equilibrium curves and shows the effect of pressure drop in our improved process.

In one form of embodiment, our invention consists in introducing a mixture of materials having boiling points relatively close at atmospheric pressure in accordance with its composition into a distillation system composed of two separate but interconnected distillation zones, effecting therein a separation of the mixture into two desired end products, removing one of the desired end products from the bottom of one of the zones, condensing the overhead distillate from said zone and then revaporizing the condensate formed and introducing the resultant vapors into the bottom of the second zone, removing the bottoms from the second zone and refluxing the first zone therewith, withdrawing the overhead distillate from the second zone as the other desired end product, and separately maintaining each zone under a vacuum. It will be fully appreciated, however, that, if necessary, we may use more than two distillation zones to accomplish a desired separation.

In accordance with a preferred form of embodiment of our invention, we have shown a bubble deck distilling column having a first distillation zone 10 and a second distillation zone 12, which is entirely separated from the first distillation zone 10 as by the closed plate section 14. The feed, which is a mixture of materials having relatively close boiling points at atmospheric pressure, is introduced at 16 or at any other point in the two distillation zones preferably in accordance with its composition. This mixture is to be separated into two desired end products, which may be either single components in a substantially pure state or particular fractions of the initial mixture. Heat may be provided for the first distillation zone by the steam circuit 18, conveniently mounted in the bottom thereof. The bottoms from the first distillation zone, comprising one of the desired end products, is removed at 20.

The overhead from the first distillation zone 10 is removed through the vapor pipe 22 and completely condensed by the condenser 23. The resulting condensate is separated from uncondensable gases in the separator 24, to which vacuum line 25 is attached for maintenance of distillation zone 10 under vacuum. The condensate is then drawn off at 26 and passed through the heat exchanger 27 and revaporized. The resulting vapors are introduced into the bottom of the second distillation zone 12 through the vapor line 28.

The vapors introduced at 28 are subjected to further separation in the second distillation zone 12, from which the overhead is removed at 30 for condensation in condenser 31. This zone is also operated under vacuum maintained by the vacuum line 33 attached to condensate separator 34. A portion of the overhead condensate is returned at 36 to the top of the second distillation zone 12 as reflux; the remainder is removed at 37 as the other desired end product. The bottoms from the second distillation zone is passed into the first distillation zone 10 through pipe 38 to serve as reflux therefor.

It will be seen that the mixture is thus given a two-step separation in the respective distillation zones. The maximum difference in pressure between the top and the bottom of the respective distillation zones arising from the pressure drop through the multiplicity of decks therein is not great, however, since each section is subjected to a vacuum, which arrangement is possible by the separate condensation of the overhead vapors from each section. It is possible under such circumstances to obtain a complete separation of the desired end product removed at 20 in the first distillation zone and a complete separation of the desired end product removed at 37 in the second distillation zone.

With the apparatus as described, the pressure drop in each distillation zone can be kept at a minimum with a resulting substantially lower overall pressure drop between the respective ends of the distillation system. As a specific example, in one instance it was possible to reduce the usual required pressure range of 50 mm. to 330 mm. when one hundred and forty decks, having the usual 2 mm. pressure drop per deck, were used to a range of 50 mm. to 190 mm. when the decks were divided into two distillation zones of seventy decks each with the result that a far superior separation was obtained. It is, therefore, possible to maintain throughout a distillation system the sufficiently low absolute pressure necessary to obtain the separation of such a mixture of two components into its individual components having a plurality of the order of 99½%.

Not only does this improved process make possible the separation of mixtures difficulty separable by distillation, but it also reduces operating costs. Necessarily, the heat input at 18 must exceed in temperature the boiling point of the end product removed at 20 at the higher pressure due to the pressure drop through the column. In a similar manner, the cooling medium introduced to the condenser 31 must be lower in temperature than the condensing temperature of the vapors comprising the end product removed at 37 at the lower pressure maintained at the top of zone 12. For these reasons added economies in operation are possible with our process because of the smaller temperature range resulting from the lower overall pressure drop through the distillation system.

Figure 1:
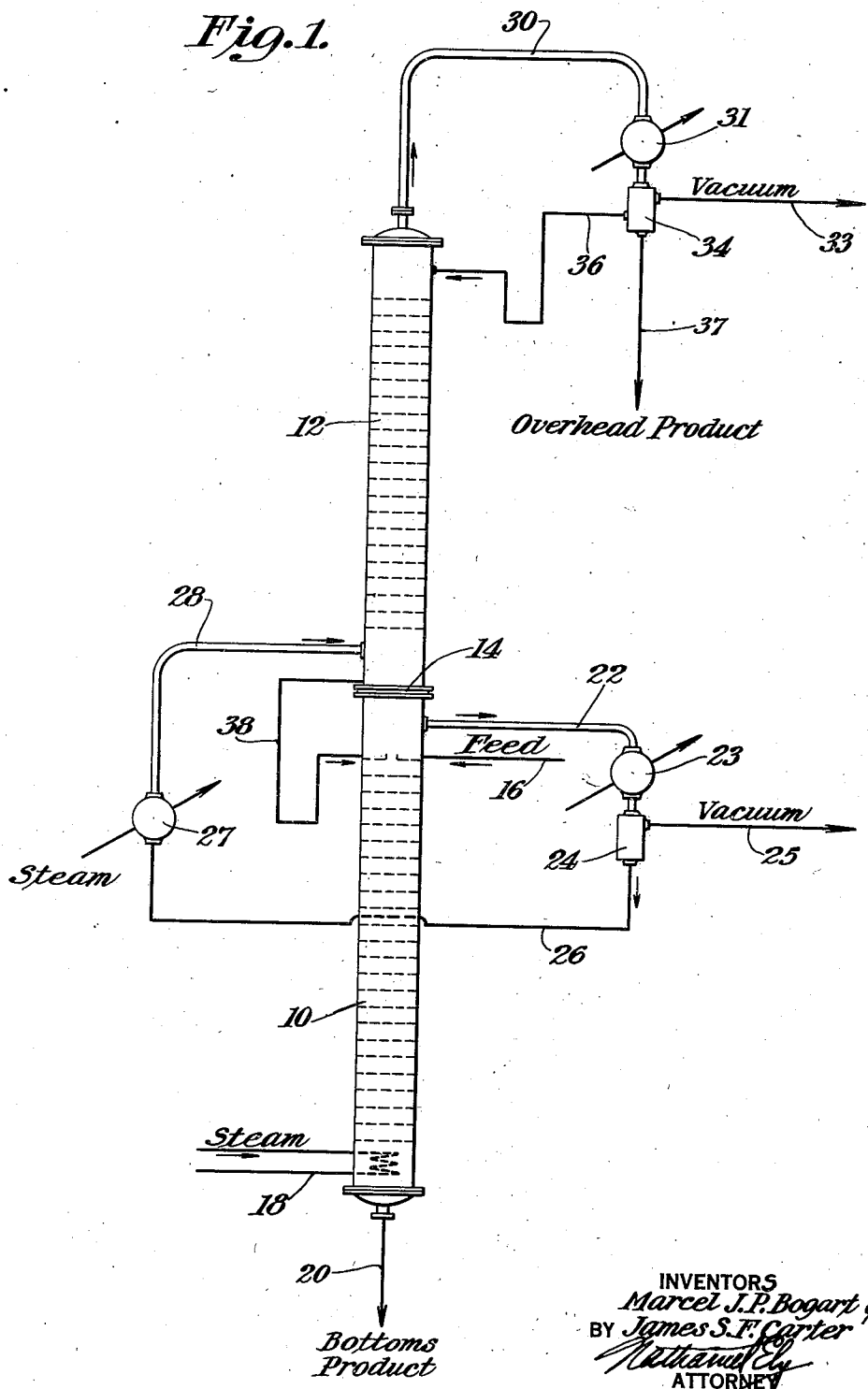
Fig. 1 is a diagrammatic layout of a two-part distillation column in accordance with our invention.
Figure 2:
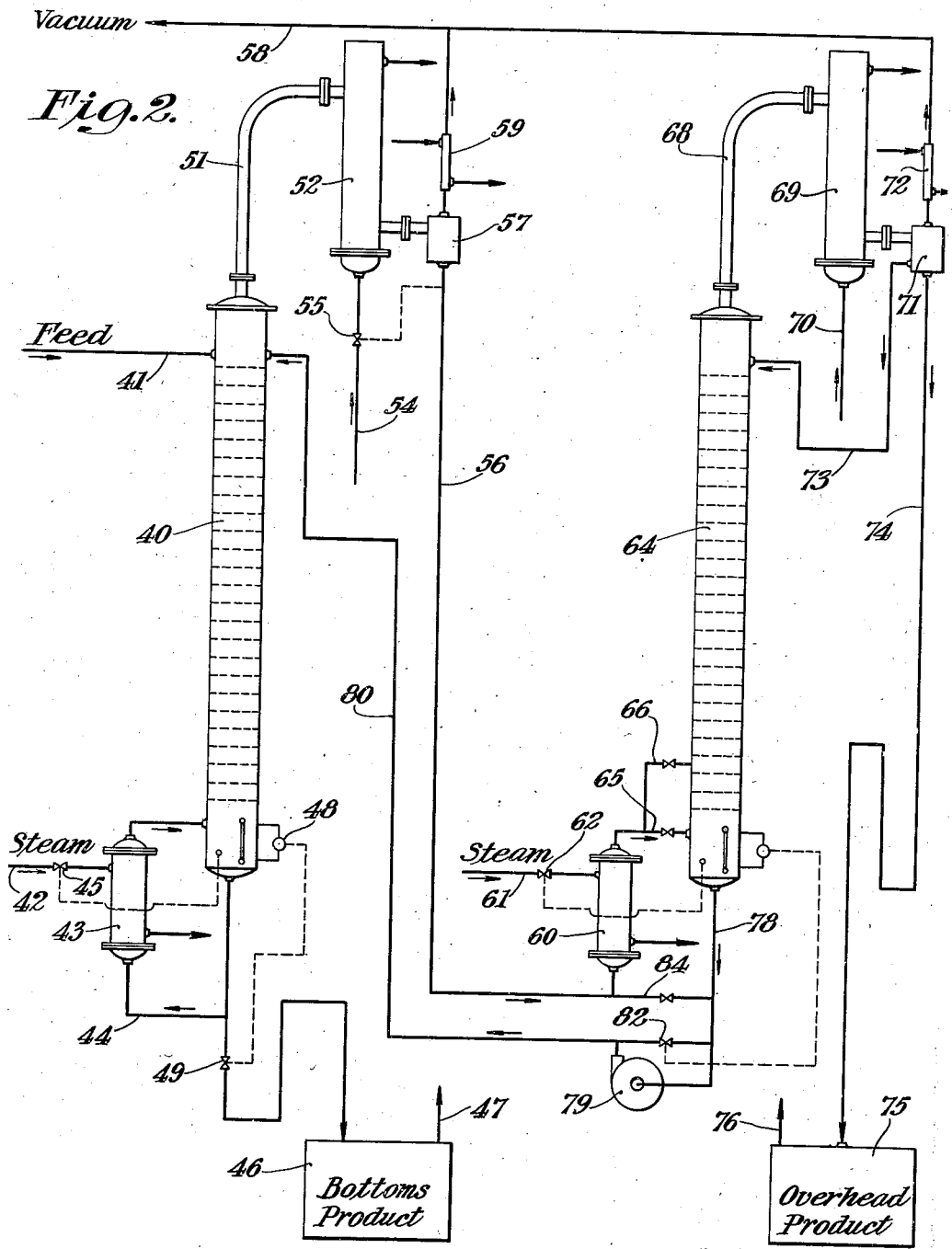
Fig. 2 is a diagrammatic layout of a plurality of single-step distillation columns as a modified form of embodiment of the invention.

If it should be found desirable to use two separate columns, it is, of course, entirely practicable to do so. An arrangement which shows such a construction is illustrated in Fig. 2. The first column 40 is adapted to receive at 41 a feed comprising a mixture of closely boiling materials as in the first case, and such mixture is initially distilled within this column. Heat for this column is conveniently supplied by the steam line 42 in heat exchange relation in exchanger 43 with a bottoms reboiling circuit 44 with the steam under automatic control 45.

A part of the bottoms comprising one of the desired end products is collected at 46 in a bottoms receiving chamber having a vacuum vent 47. The liquid level in the bottom of the first distillation column 40 is under control of the liquid level control 48, which operates the valve 49 on the bottoms product discharge line. The remainder of the bottoms is recirculated at 44 for reboiling as above described.

The overhead vapors from the first column are discharged at 51 into the total condenser 52, the temperature of which is maintained uniform by the incoming cooling medium 54 under temperature control 55 operated from the condensate line 56. The condensate from the condenser 52 is separated from the uncondensable gas in the liquid separator 57, which is maintained under vacuum from the line 58. A vent cooler 59 may be placed in this line to assure the complete separation of liquid from the gases.

The condensate removed at 56 is now further distilled for the complete removal of the second desired end product. This object is accomplished by revaporizing the condensate in a heat exchanger 60 and introducing the resulting vapors into the second distillation column 64. The vapors may be introduced at 65 or 66 depending on whether or not some separation is desired between these vapors and the bottoms removed at 78. As in the prior case, the revaporizing of the condensate is conveniently accomplished by passing the condensate through a heat exchanger 60, which is effectively heated by steam introduced at 61 under control of control valve 62. The bottoms removed at 78 may be in part circulated through the heat exchanger 60 under suitable control of valve 84 if such operation is found desirable.

In this second distillation column, the vapors which are removed overhead at 68 are condensed at 69 by a cooling medium 70, and the condensate is separted from the uncondensable gases in the separator 71, which is maintained under a vacuum from line 58. A vent cooler 72 may also be placed in the vacuum line. Part of the condensate is returned through line 73 to column 64 as reflux. The liquid removed through the line 74 comprises the other desired end product and is conveniently collected at 75 in a suitable receiving chamber having the vacuum vent 76.

The bottoms removed at 78 from the second column 64 is conveniently pumped by the pump 79 through the line 80 to the top of the first column 40 to serve as reflux therefor. If desired, an automatic liquid level control valve 82, operated by the level of liquid in the bottom of the second column, may be provided in this line.

It will be seen, therefore, that our process may be carried out with equal effectiveness in a single two-section column or in a plurality of single columns. The selection of the particular system used will be governed by the special circumstance surrounding each case.

Our improved process is especially adapted to the separation of liquid mixtures into predetermined fractions, the components of which have the following particular characteristics: (1) their boiling points are relatively close (within about 15° C.) at atmospheric pressure; (2) their vapor pressure curves converge as the absolute pressure is increased from a perfect vacuum; and (3) the vapor enrichment accomplished at any particular stage of distillation is relatively small although greatest at the lowest absolute pressure.

Where operation in the customary manner in a single column under substantial vacuum is essential because of the impracticability of obtaining any reasonable degree of separation at atmospheric pressure or above as a result of the converging nature of the vapor pressure curves of the components of a mixture, it is still impossible commercially to separate some mixtures into their respective components because the pressure drop through the distillation column nullifies the benefit of the lowest absolute pressure which can be applied at the top of the column and thus puts a practical limitation on the separation possible. Such a separation may, however, be effectively accomplished by vacuum distillation with the aid of our improved process.

Comparison of the graphs shown in Figs. 3 and 4, respectively, will clearly indicate the advantages of our improved distillation procedure. These graps show the liquid-vapor ($x$—$y$) equilibrium curves for a hypothetical mixture of two components having the above characteristics at several different absolute pressures (0.1, 0.2, 0.3, and 0.4 atm., for example). (The curves have been somewhat exaggerated for the sake of clarity because of the small size of the graph. It will be appreciated that, if the curves were drawn to conform to an actual case, they would all be crowded together close to the 45° line.) It will be noted that, as the pressure increases, the equilibrium curve approaches the 45° line more closely. Now, because the vapor pressure curves of the two components are close even at low absolute pressures, the enrichment of one component between the liquid and the vapor for any given liquid composition even at the lowest absolute pressure is small (see A, Fig. 3—somewhat exaggerated because of small scale). Accordingly, since the equilibrium curve approaches the 45° line with an increase in pressure, the degree of enrichment of that component between the liquid and the vapor also becomes correspondingly less (cp. B, Fig. 3—also exaggerated because of small scale).

In Fig. 3 the effect of the pressure drop through the distillation apparatus is shown when customary distillation procedure, in which a single column is used, is followed where it is desired to separate a 50—50 mol per cent mixture of two components into two fractions, one containing 95 mol per cent of one component and the other containing 95 mol per cent of the other component, and where an absolute pressure of 0.1 atm. is to be maintained at the top of the column. Since the pressure in a column increases as the bottom is approached because of the pressure drop therethrough, the equilibrium curve for the particular mixture being separated is gradually toed in towards the 45° line as the bottom of the column is approached. The result is indicated by the equilibrium curve CDE, which has been corrected for the increase in pressure resulting from the pressure drop through the column. The area between curve CDE and the 45° line represents the advantage that can be taken in this case of the 0.1 atm. pressure maintained at the top of the column. It will be noted that, although one product having the desired composition but not the desired quantity can be obtained as the overhead distillate, the other composition cannot be produced by this practice.

The advantage to be gained by the use of our improved process is shown in Fig. 4. In this case a distillation system comprising two separate but interrelated distillation zones accomplishes the desired separation of the above mixture. A separate pressure of 0.1 atm. is maintained at the top of each zone. The initial mixture may preferably be introduced at the top of the first or lower zone. Although the pressure drop through the two zones still causes the equilibrium curve to toe in towards the 45° line, the effect of the pressure drop is noticeably less. The resulting equilibrium curve is indicated by the line CDFG, the area between which and the 45° line represents the advantage that can be taken by operation of this process at 0.1 atm. pressure at the top of each zone. It should also be noted that in this case both of the desired products having the desired compositions are produced. The vacuum may be independently or equally applied to the two zones as desired.

Mixtures of organic compounds, which have the above characteristics and which may be separated by the foregoing process, usually include isomeric or homologous compounds of the aliphatic, aromatic, alicyclic, or heterocyclic classification although in some cases we have found the process suitable for the separation of mixed compounds where their boiling point curves are so close that the vapor enrichment is comparatively small.

Specific examples of mixtures of materials in the aliphatic group which may be separated in accordance with our process are mixtures of allyl alcohol and isopropyl alcohol; mixtures of secondary butyl alcohol and tertiary amyl alcohol; mixtures of normal butyl alcohol and secondary amyl alcohol; as well as mixtures of isomeric alcohols. It is also possible to separate other isomeric aliphatic compounds such as the isomers of heptane. Other aliphatic mixtures such as mixtures of n-heptane and heptene-1 may also be separated.

In the aromatic hydrocarbon class, isomeric, homologous, or mixed benzenes and benzene derivatives are separable, such as isomeric chlorbenzenes and chlortoluenes, particularly ortho- and para-chlortoluene; isomeric aromatic hydroxy-compounds such as ortho- and meta-cresol; isomers of xylenes; isomers of trimethylbenzenes; homologous materials such as cresol and phenol; or mixed aromatic compounds.

Mixtures of alicyclic compounds to which our process is especially applicable include mixtures of the terpenes such as mixtures of alpha- and beta-pinene. It will be understood, however, that our process is not necessarily limited to the particular mixtures enumerated. Our process may also be applied to the separation of mixtures of heterocyclic organic compounds.

Another factor which may make the use of our process desirable is that the temperature at the lower part of the distillation column can be kept lower than with usual practice because of the lower pressure. In some cases, where decomposition of the material being distilled might take place at the higher temperature, our process affords a convenient method of operation within the critical temperature range.

It will also be appreciated that the components of the mixtures separated by our process need not be liquid at ordinary temperatures. It is essential, however, that the components of a particular mixture, when in the liquid state, have the characteristics set out above. The applicability of our process in such case will depend on the cost and effect of refrigeration or heating, whichever may be necessary.

While we have shown a preferred form of embodiment of the invention, we are aware that modifications may be made thereto without departing from the scope and spirit of the invention disclosed herein; therefore, only such limitations as appear in the claims appended hereinafter should be imposed.

We claim:

1. In the method for the separation by distillation of a mixture of organic compounds into fractions of predetermined purity, the components of said mixture having relatively close boiling points at atmospheric pressure and having vapor pressure curves that converge with an increase in absolute pressure, the degree of enrichment between liquid and vapor being small and decreasing with an increase in pressure, the steps which comprise continuously feeding the mixture to a distillation system at a point corresponding to its composition, said system being composed of a plurality of separate but interrelated distillation zones, said distillation zones together having a combined total pressure drop such that the resulting increase in pressure would render the degree of enrichment negligible before the predetermined separation could be effected, maintaining an independent vacuum on each zone, condensing the overhead distillate from each zone, revaporizing the overhead condensate from each zone but the last and feeding the resulting condensate vapors to the bottom of the next subsequent distillation zone, the overhead condensate from the last distillation zone being an end product comprising one of said predetermined fractions, withdrawing the bottoms from each distillation zone but the first and refluxing the next preceding distillation zone therewith, and withdrawing the bottoms from the first distillation zone as another end product comprising the other of said predetermined fractions.

2. In the method for the separation by distillation of a mixture of components selected from the group consisting of aliphatic, aromatic, alicyclic and heterocyclic compounds and their derivatives into predetermined end products in a state of substantial purity, the components of said mixture having relatively close boiling points at atmospheric pressure and having vapor pressure curves that converge with an increase in absolute pressure, the degree of enrichment between liquid and vapor being small and decreasing with an increase in pressure, the steps which comprise continuously feeding the mixture to a distillation system at a point corresponding to its composition, said system being composed of two separate but interrelated distillation zones, said distillation zones together having a combined total pressure drop such that the resulting increase in pressure would render the degree of enrichment negligible before the predetermined separation could be effected, maintaining an independent vacuum on each zone, condensing the overhead distillate from each zone, revaporizing the overhead condensate from one of said zones and feeding the resulting condensate vapors to the bottom of the second zone, the overhead condensate from the second zone being one of the end products in a state of substantial purity, withdrawing the bottoms from the second zone and refluxing the first zone therewith, and withdrawing the bottoms from the first zone as the other end product in a state of substantial purity.

3. The method for the separation by distillation of a mixture of components as claimed in claim 2, in which one or more of the components includes a halogen radical.

4. The method for the separation by distillation of a mixture of components as claimed in claim 2, in which one or more of the components includes a hydroxyl radical.

5. The method for the separation by distillation of a mixture of components as claimed in claim 2, in which the components are isomers of xylene.

6. The method for the separation by distillation of a mixture of components as claimed in claim 2, in which the components are terpenes.

7. The method for the separation by distillation of a mixture of components as claimed in claim 2, in which the components are isomers of pinene.

8. The method for the separation by distillation of a mixture of components as claimed in claim 2, in which the components are halogen-containing derivatives of benzene.

9. The method for the separation by distillation of a mixture of components as claimed in claim 2, in which the components are hydroxyl-containing derivatives of benzene.

10. The method for the separation by distillation of a mixture of components as claimed in claim 2, in which the components are aliphatic alcohols.

MARCEL J. P. BOGART.
JAMES S. F. CARTER.

CERTIFICATE OF CORRECTION.

Patent No. 2,311,180. February 16, 1943.

MARCEL J. P. BOGART, ET AL.

It is hereby certified that error appears in the printed specification of the above numbered patent requiring correction as follows: Page 2, second column, line 5, for "plurality" read --purity--; line 7, for "difficulty" read --difficultly--; page 3, first column, line 55, for "graps" read --graphs--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.